US008825103B2

(12) United States Patent
Yamamoto et al.

(10) Patent No.: US 8,825,103 B2
(45) Date of Patent: Sep. 2, 2014

(54) TRANSMISSION POWER CONTROL

(75) Inventors: Toru Yamamoto, Tokyo (JP); Saho Furukawa, Tokyo (JP)

(73) Assignee: Nec Corporation, Tokyo (JP)

( * ) Notice: Subject to any disclaimer, the term of this patent is extended or adjusted under 35 U.S.C. 154(b) by 435 days.

(21) Appl. No.: 13/240,485

(22) Filed: Sep. 22, 2011

(65) Prior Publication Data

US 2012/0100882 A1 Apr. 26, 2012

(30) Foreign Application Priority Data

Oct. 21, 2010 (JP) ................................. 2010-236541

(51) Int. Cl.
*H04W 52/04* (2009.01)
*H04W 52/34* (2009.01)
*H04W 52/24* (2009.01)
*H04W 52/22* (2009.01)
*H04W 52/20* (2009.01)

(52) U.S. Cl.
CPC .......... *H04W 52/343* (2013.01); *H04W 52/247* (2013.01); *H04W 52/246* (2013.01); *H04W 52/226* (2013.01); *H04W 52/20* (2013.01); *H04W 52/245* (2013.01)
USPC ....... 455/522; 455/67.11; 455/135; 455/13.4; 455/115.1

(58) Field of Classification Search
CPC . H04W 52/20; H04W 52/226; H04W 52/245; H04W 52/246; H04W 52/247; H04W 52/343; H04W 36/20; H04W 52/00; H04W 52/04; H04W 52/06; H04W 52/30; H04W 52/52; H04W 52/54; H04W 52/18; H04W 52/544
USPC ................ 455/522, 69, 452.2, 450, 101, 506, 455/67.13, 161.3; 370/342, 332, 335, 252
See application file for complete search history.

(56) References Cited

U.S. PATENT DOCUMENTS 6,985,453 B2 * 1/2006 Lundby et al. ................ 370/311
7,301,989 B2 * 11/2007 Tamaki et al. ................ 375/146
(Continued)

FOREIGN PATENT DOCUMENTS

GB WO 2010/037571 A1 * 4/2010 ............ H04W 52/32
JP 10-155184 A 6/1998
(Continued)

OTHER PUBLICATIONS

The Extended European Search Report of EP Application No. 11182273.0 dated Dec. 5, 2013.
(Continued)

*Primary Examiner* — Tan Trinh
(74) *Attorney, Agent, or Firm* — Sughrue Mion, PLLC

(57) ABSTRACT

A quality measuring section measures reception quality of a radio signal received by a wireless communication section. A quality information transmitting section transmits reception quality information indicating the reception quality measured by the quality measuring section. A device number calculating section calculates, based on reception quality indicated by reception quality information transmitted from other wireless communication devices and the reception quality measured by the quality measuring section, the number of wireless communication devices, from among the other wireless communication devices, that can communicate with the wireless communication device including this device number calculating section. A power value determining section compares the number of the wireless communication devices calculated by the device number calculating section with a predetermined number of devices, to determine, on the basis of the comparison result, a transmission power value for the wireless communication section to transmit the radio signal.

13 Claims, 6 Drawing Sheets

(56) References Cited

U.S. PATENT DOCUMENTS

| | | | |
|---|---|---|---|
| 7,986,672 B2 * | 7/2011 | Tiedemann et al. | 370/332 |
| 2002/0110088 A1 * | 8/2002 | Lundby et al. | 370/252 |
| 2003/0161285 A1 * | 8/2003 | Tiedemann et al. | 370/332 |
| 2004/0176033 A1 * | 9/2004 | Tamaki et al. | 455/59 |
| 2007/0129024 A1 * | 6/2007 | Kikuma | 455/101 |
| 2008/0130613 A1 * | 6/2008 | Tiedemann et al. | 370/342 |
| 2008/0310479 A1 * | 12/2008 | Koslar et al. | 375/131 |
| 2009/0082055 A1 * | 3/2009 | Mueller | 455/522 |
| 2009/0239547 A1 * | 9/2009 | Nitta et al. | 455/452.2 |
| 2012/0295670 A1 * | 11/2012 | Rofougaran | 455/572 |
| 2013/0310116 A1 * | 11/2013 | Rofougaran | 455/572 |

FOREIGN PATENT DOCUMENTS

| | | |
|---|---|---|
| JP | 2002271263 A | 9/2002 |
| JP | 2006262502 A | 9/2006 |
| JP | 2006-270535 A | 10/2006 |
| JP | 2008-507883 A | 3/2008 |
| JP | 2008-301444 A | 12/2008 |
| JP | 2008-306293 A | 12/2008 |
| JP | 2010016561 A | 1/2010 |
| JP | 2010109628 A | 5/2010 |
| JP | 2010200164 A | 9/2010 |
| WO | 2005/022775 A1 | 3/2005 |
| WO | 2008/059678 A1 | 5/2008 |
| WO | 2009/107297 A1 | 9/2009 |
| WO | 2010/037571 A1 | 4/2010 |

OTHER PUBLICATIONS

Japanese Office Action for JP Application No. 2010-236541 mailed on Feb. 18, 2014 with English Translation.

* cited by examiner

TRANSMISSION POWER CONTROL

This application is based upon and claims the benefit of priority from Japanese Patent Application No. 2010-236541 filed on Oct. 21, 2010, the content of which is incorporated by reference.

BACKGROUND OF THE INVENTION

1. Field of the Invention

The present invention relates to a wireless communication device, a transmission power controlling method, and a program that control the power for transmitting a radio signal.

2. Description of the Related Art

As a technique for providing efficient wireless communications, a procedure for dynamically acquiring an unused channel by frequency hopping with a plurality of channels is implemented in a large number of wireless communication systems.

In addition, examples of wireless communication devices including a wireless LAN (Local Area Network) communication function to which a standard such as IEEE 802.11 is applied include a device that can change a value of transmission power for transmitting a radio signal from the wireless communication device by setting parameters from the outside. In such a wireless communication device, in order to reduce radio wave interference between wireless communication devices and to prevent wire tapping due to a radio wave leak, a value of transmission power that does not exceed a value determined as an upper limit standard may be adjusted.

In addition, as forms of wireless communication, a single-hop scheme in which a transmitting node and a receiving node directly communicate with each other and a multihop scheme in which a transmitting node communicates with a receiving node via a relay node are known.

Examples of multihop schemes include a variety of schemes such as the AODV (Ad-hoc On Demand Distance Vector) and the OLSR (Optimized Link State Routing) protocols discussed in the MANET-WG (Mobile Ad-hoc Network Working Group). In any one of the schemes, routing control information is exchanged between peripheral nodes to construct a communication path.

However, such a technique has problems described below.

A first problem is that because wireless communications limit the number of available channels, wireless networks for a plurality of applications coexist in the same area. Therefore, a large number of wireless communication devices exist in the same area. Disadvantageously, an increased amount of communications between these wireless communication devices may cause congestion and longer delay time.

The reason is as follows. In wireless communications, to avoid effects due to the distance of wireless transmission and obstacles on a wireless transmission path, communication is performed in accordance with maximum transmission power defined in a standard. Therefore, it is highly likely that a radio wave reaches an area unnecessary for the communication. If a radio wave reaches an area unnecessary for the communication, the number of collisions of signals on a transmission path, signal retransmission due to the collisions, and transmission waiting time due to carrier detection on the transmission path increase, resulting in degraded throughput of an overall network.

A second problem is the fact that transmitted signals, that can be received even outside an area that the signals need to reach, may lead to security concerns such as wire tapping.

The reason is as follows. An appropriate value as a transmission power value cannot be known in advance, so that the maximum transmission power defined in a standard has to be set to provide stable communications.

Thus, techniques for, based on radio wave strength and the noise level of a received radio signal, controlling the transmission power for transmitting a radio signal have been conceived (For example, see JP2010-200164A and JP2010-016561A).

However, the technique described in JP2010-200164A has a problem that two radio systems need to be used.

In addition, the techniques described in JP2010-200164A and JP2010-016561A do not take into account the number of wireless communication devices with which a wireless communication device that transmits a radio signal communicates. Therefore, even if the number of wireless communication devices with which the wireless communication device communicates varies, the same transmission power value is calculated. Thus, for example, when a calculated transmission power value is the best value for transmission to one wireless communication device, if the wireless communication device attempts to communicate with a plurality of wireless communication devices, the radio wave may not reach the device. In addition, when a calculated transmission power value is the best value for transmission to a plurality of wireless communication devices, if the wireless communication device transmits a signal to communicate with only one wireless communication device, the problems described above (e.g., deteriorated throughput) may arise.

An object of the present invention is to provide a wireless communication device, a transmission power controlling method, and a program that solve these problems.

SUMMARY OF THE INVENTION

A wireless communication device of the present invention is a wireless communication device for wirelessly communicating with other wireless communication devices by using a wireless network communication function, the device comprising: a wireless communication section that transmits and receives a radio signal transmitted from the other wireless communication devices; a quality measuring section that measures reception quality of the radio signal received by the wireless communication section; a quality information transmitting section that transmits reception quality information indicating the reception quality measured by the quality measuring section to the other wireless communication devices through the wireless communication section; a device number calculating section that calculates, based on the reception quality indicated by reception quality information transmitted from the other wireless communication devices and the reception quality measured by the quality measuring section, the number of wireless communication devices, from among the other wireless communication devices, that can communicate with the wireless communication device; and a power value determining section that compares the number of the wireless communication devices calculated by the device number calculating section with a predetermined number of devices, to determine, on the basis of the comparison result, a transmission power value for the wireless communication section to transmit the radio signal, wherein the wireless communication section transmits the radio signal by using the transmission power of the transmission power value determined by the power value determining section.

In addition, the transmission power controlling method of the present invention is a transmission power controlling method of controlling transmission power used to transmit a radio signal by a wireless communication device for wirelessly communicating with other wireless communication devices by using a wireless network communication function, the method comprising the processes of: measuring reception quality of a radio signal transmitted from the other wireless communication devices; transmitting reception quality information indicating the measured reception quality to the other wireless communication devices; calculating, based on the reception quality indicated by the reception quality information transmitted from the other wireless communication devices and the measured reception quality, the number of wireless communication devices, from among the other wireless communication devices, that can communicate with the wireless communication device; comparing the calculated number of the wireless communication devices with a predetermined device number; determining, on the basis of the comparison result, a transmission power value for transmitting the radio signal; and transmitting the radio signal by using the transmission power of the determined transmission power value.

In addition, a program of the present invention is a program for causing a wireless communication device for wirelessly communicating with other wireless communication devices by using a wireless network communication function to execute the procedures of: measuring reception quality of a radio signal transmitted from the other wireless communication devices; transmitting reception quality information indicating the measured reception quality to the other wireless communication devices; calculating, based on the reception quality indicated by the reception quality information transmitted from the other wireless communication devices and the measured reception quality, the number of wireless communication devices, from among the other wireless communication devices, that can communicate with the wireless communication device; comparing the calculated number of the wireless communication devices with a predetermined device number; determining, on the basis of the comparison result, a transmission power value for transmitting the radio signal; and transmitting the radio signal by using the transmission power of the determined transmission power value.

As described above, the present invention can provide efficient wireless communication based on the number of wireless communication devices that are communication targets.

The above and other objects, features, and advantages of the present invention will become apparent from the following description with reference to the accompanying drawings which illustrate an example of the present invention.

DETAILED DESCRIPTION OF THE PREFERRED EMBODIMENTS

Hereinafter, exemplary embodiments will be described with reference to the drawings.

Figure 1:
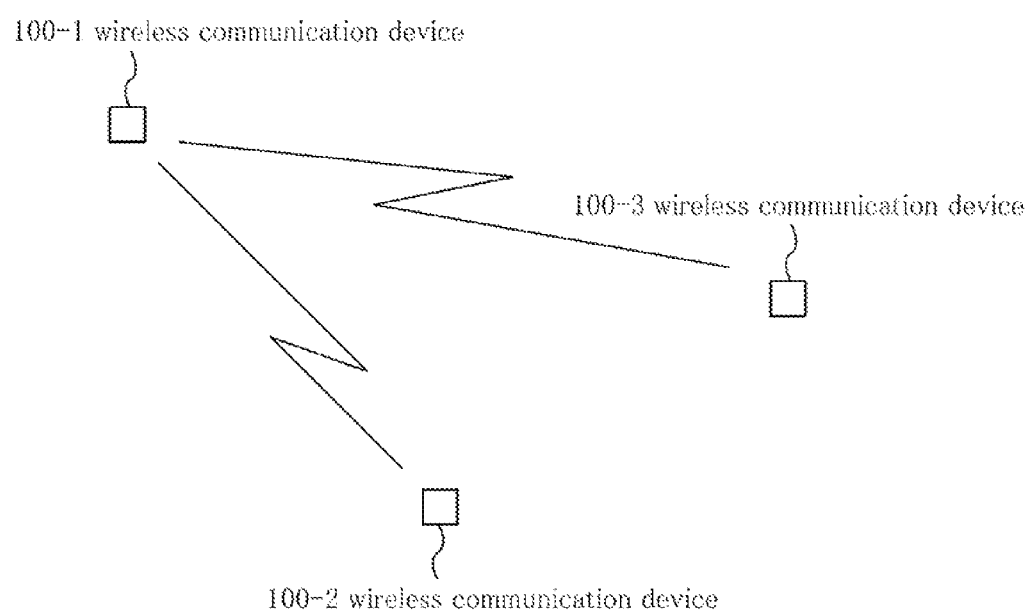
FIG. 1 is a diagram illustrating a form of connection from a wireless communication device of the present invention.

Referring to FIG. 1, a system is shown in which wireless communication devices 100-1 to 100-3 are positioned so that they can wirelessly communicate with each other.

Wireless communication devices 100-1 to 100-3 are devices that wirelessly communicate with each other by using a wireless network communication function. It should be noted that FIG. 1 shows an example including three wireless communication devices, but of course, four or more devices may be included. The term "wireless network communication function" as used herein means a wireless communication function to perform ad-hoc communication, including a wireless LAN communication function to which a standard such as IEEE 802.11 is applied, a Pan (Personal Area Network) communication function, a SUN (Smart Utility Networks) communication function, and a HAN (Home Area Networks) communication function to which a standard such as IEEE 802.15.4d and IEEE 802.15.4g/e are applied.

Figure 2:
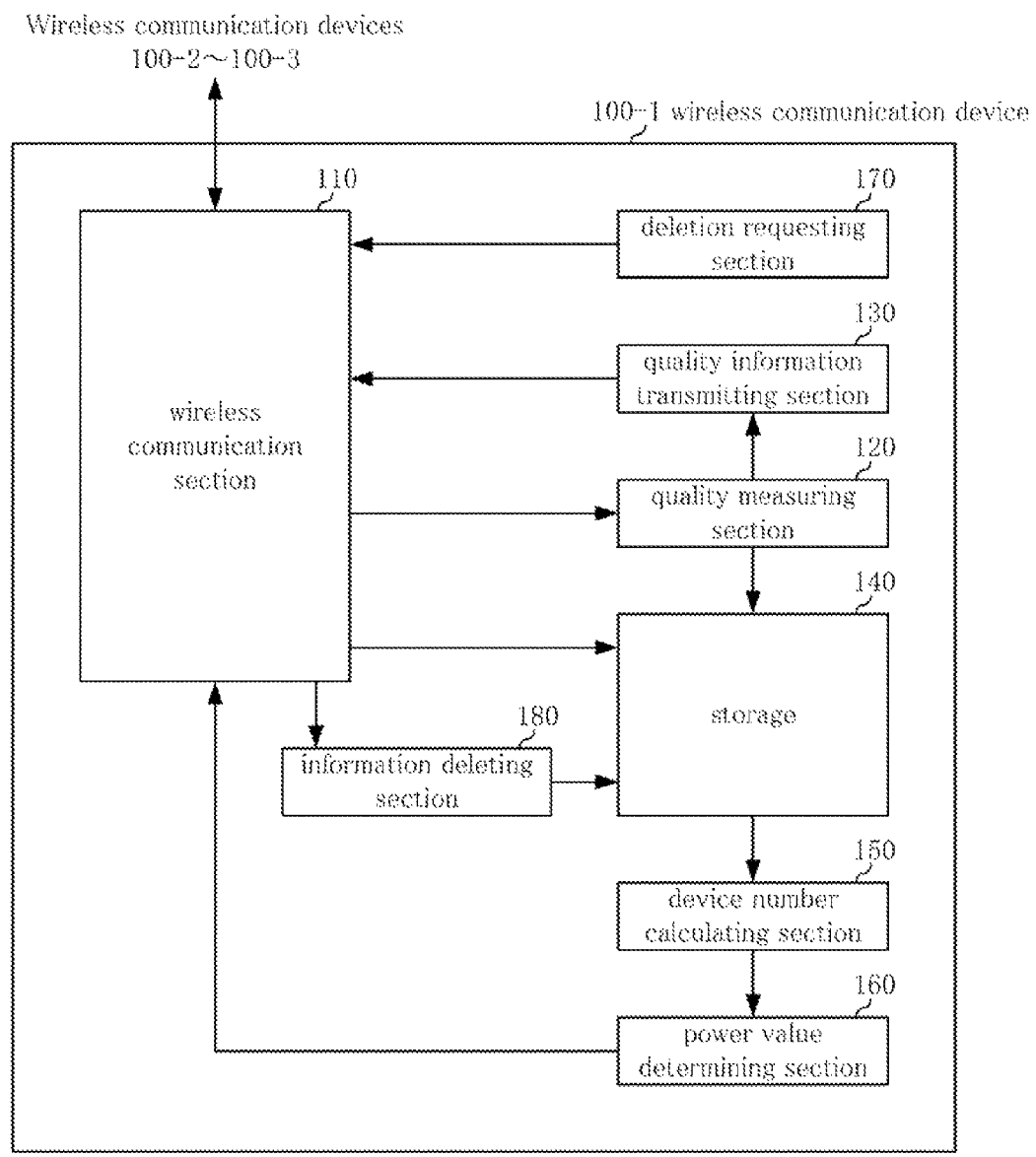
FIG. 2 is a drawing illustrating an example of an internal configuration of the wireless communication device illustrated in FIG. 1.

Wireless communication device 100-1 illustrated in FIG. 1 includes, as illustrated in FIG. 2, wireless communication section 110, quality measuring section 120, quality information transmitting section 130, storage 140, device number calculating section 150, power value determining section 160, deletion requesting section 170, and information deleting section 180. It should be noted that internal configurations of wireless communication devices 100-2 to 100-3 illustrated in FIG. 1 are same as the internal configuration of wireless communication device 100-1.

Wireless communication section 110 receives radio signals transmitted from wireless communication devices 100-2 to 100-3, which are other wireless communication devices. Wireless communication section 110 also transmits a radio signal to wireless communication devices 100-2 to 100-3 by using the transmission power of a transmission power value output from power value determining section 160.

Quality measuring section 120 measures reception quality of a radio signal received by wireless communication section 110. Quality information to be measured may be the received field intensity of a radio signal received by wireless communication section 110 or the error rate in radio signals received by wireless communication section 110, that is, the quality information may be any information that can be used to determine the quality of a received radio signal. Methods of measuring the received field intensity and the error rate may be those generally used. For example, the retransmission rates of signals may be used as an error rate or a field for error detection included in a received signal may be used. In addition, quality measuring section 120 outputs reception quality information indicating measured reception quality to quality information transmitting section 130.

Quality information transmitting section 130 transmits the reception quality information output from quality measuring section 120 to wireless communication devices 100-2 to 100-3 through wireless communication section 110. At this time, quality information transmitting section 130 embeds (inserts) the reception quality information into a predetermined position of a radio signal to be transmitted through wireless communication section 110 and transmits the signal.

Storage 140 stores reception quality information indicating the reception quality measured by quality measuring section 120. Storage 140 also stores reception quality information transmitted from wireless communication devices 100-2 to 100-3.

Device number calculating section 150 calculates, from wireless communication devices 100-2 to 100-3, the number of wireless communication devices that can communicate with wireless communication device 100-1, based on the reception quality indicated by the reception quality information transmitted from wireless communication devices 100-2 to 100-3 and the reception quality measured by quality measuring section 120. It should be noted that if storage 140 stores therein the information, the reception quality information stored in storage 140 will be used. To calculate the number, a calculating method may also be used for counting the number of wireless communication devices in which reception quality of a signal rises above a preset threshold value, as wireless communication devices that can communicate with wireless communication device 100-1. In addition, device number calculating section 150 outputs the calculated number to power value determining section 160.

Power value determining section 160 compares the number of wireless communication devices output from device number calculating section 150 with the predetermined number of devices. Power value determining section 160 then determines, on the basis of the comparison result, a transmission power value used by wireless communication section 110 to transmit the radio signal. The term "predetermined number of devices" as used herein means a number designated by an external device such as a host server connected with wireless communication device 100-1. The number may be stored in storage 140 after being designated.

Specifically, if the number of wireless communication devices output from device number calculating section 150 is lower than the predetermined device number, power value determining section 160 determines a transmission power value to be a value obtained by increasing the current value. In addition, if the number of wireless communication devices output from device number calculating section 150 is higher than the predetermined device number, power value determining section 160 determines a transmission power value to be the value obtained by decreasing a current value. In addition, if the number of wireless communication devices output from device number calculating section 150 is equal to the predetermined device number, power value determining section 160 determines a transmission power value to be the value obtained by maintaining a current value. It should be noted that ranges of increase and decrease in the transmission power value are not specified.

Furthermore, if quality measuring section 120 cannot measure reception quality or if reception quality information is not transmitted from wireless communication devices 100-2 to 100-3, power value determining section 160 determines a transmission power value to be the preset initial value.

Moreover, power value determining section 160 outputs the determined transmission power value to wireless communication section 110.

Deletion requesting section 170 requests wireless communication devices 100-2 to 100-3 through wireless communication section 110 to, when power value determining section 160 changes the transmission power value from a current value to another value, delete the reception quality information stored in storages included in wireless communication devices 100-2 to 100-3.

Information deleting section 180 deletes (clears) the reception quality information stored in storage 140 if a request to delete the reception quality information is received from wireless communication devices 100-2 to 100-3 through wireless communication section 110.

Figure 3:
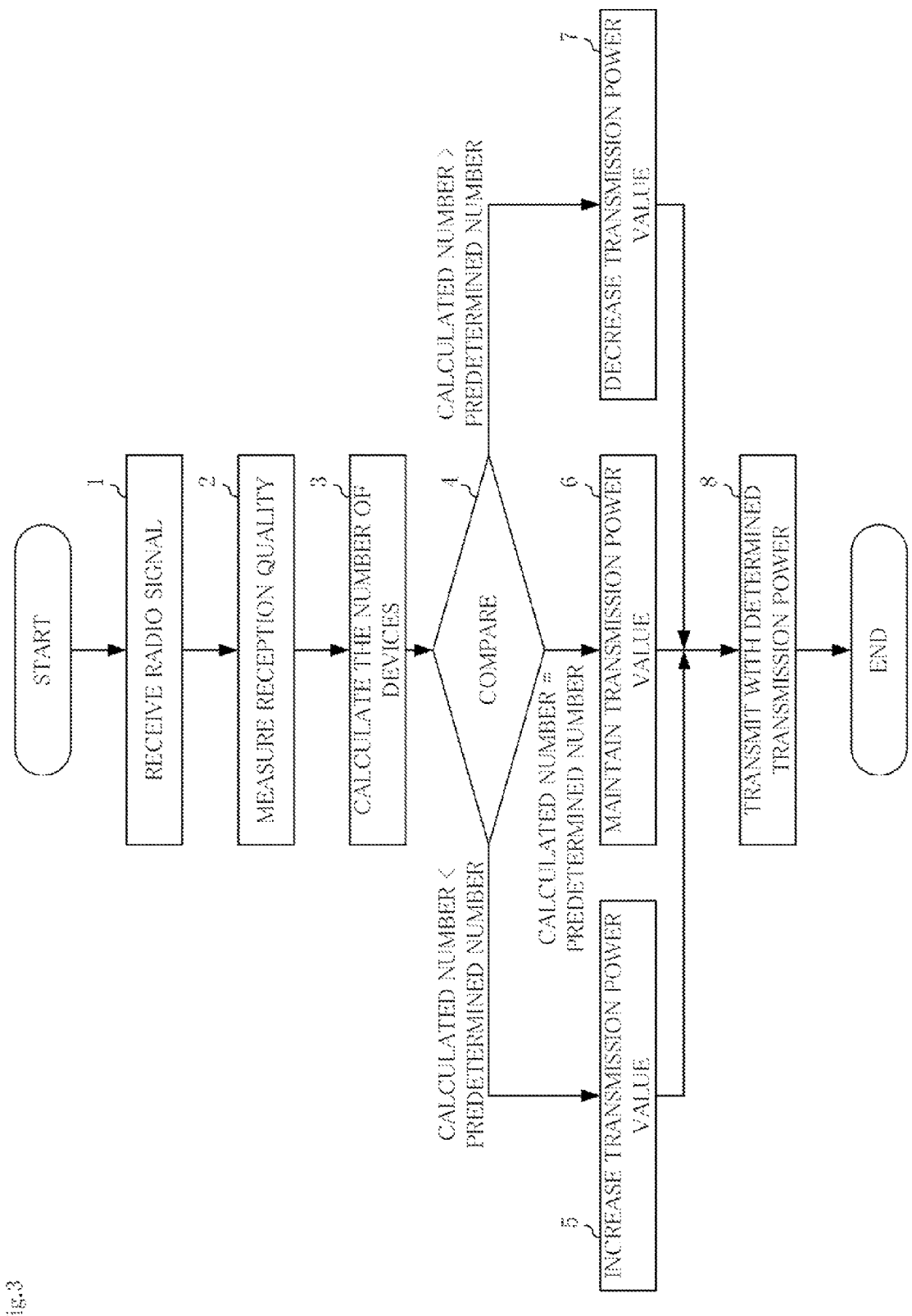
FIG. 3 is a flow chart for explaining the transmission power controlling method in this form.

A transmission power controlling method of this exemplary embodiment will be described below with reference to FIG. 3. Now, a transmission power controlling method used in wireless communication device 100-1 illustrated in FIG. 1 will be described with an example.

First, if wireless communication section 110 receives a radio signal in step 1, quality measuring section 120 measures reception quality of the received radio signal in step 2.

Reception quality information indicating the reception quality measured by quality measuring section 120 is transmitted from quality information transmitting section 130 to wireless communication devices 100-2 to 100-3 through wireless communication section 110.

Next, reception quality information indicating the reception quality measured by quality measuring section 120 is written into storage 140.

Meanwhile, reception quality information transmitted from wireless communication devices 100-2 to 100-3 is written into storage 140.

Thereafter, based on the reception quality indicated by the reception quality information written in storage 140, namely, the reception quality measured by quality measuring section 120 and the reception quality indicated by the reception quality information transmitted from wireless communication devices 100-2 to 100-3, device number calculating section 150 calculates, from wireless communication devices 100-2 to 100-3, the number of wireless communication devices that can communicate with wireless communication device 100-1 in step 3. The calculated number of devices is output from device number calculating section 150 to power value determining section 160.

Then, power value determining section 160 compares the number of wireless communication devices output from device number calculating section 150 with the predetermined device number in step 4.

As a comparison result in step 4, if the number of wireless communication devices output from device number calculating section 150 is lower than the predetermined device number, power value determining section 160 determines a value obtained by increasing the current transmission power value as the transmission power value in step 5.

Alternatively, as a comparison result in step 4, if the number of wireless communication devices output from device number calculating section 150 is equal to the predetermined device number, power value determining section 160 determines a value obtained by maintaining the current transmission power value as the transmission power value in step 6.

Alternatively, as a comparison result in step 4, if the number of wireless communication devices output from device number calculating section 150 is higher than the predetermined device number, power value determining section 160 determines a value obtained by decreasing the current transmission power value as the transmission power value in step 7.

Then, the determined transmission power value is output from power value determining section 160 to wireless communication section 110, and in step 8, when wireless communication section 110 transmits a radio signal, the radio signal is transmitted with transmission power indicated by the transmission power value.

Now, using examples that show the positions of wireless communication terminals, transmission power control in those positions will be described. It should be noted that hereinafter, because the basic concept of the wireless communication and the basic concept, the basic operation, and the basic configuration of the multihop communication are known by those skilled in the art, a detailed description thereof will be omitted. In addition, a wireless communication device that transmits a radio signal will be referred to as the "transmitting node" and a wireless communication device that receives a radio signal transmitted from the transmitting node will be referred to as the "receiving node."

Figure 4:
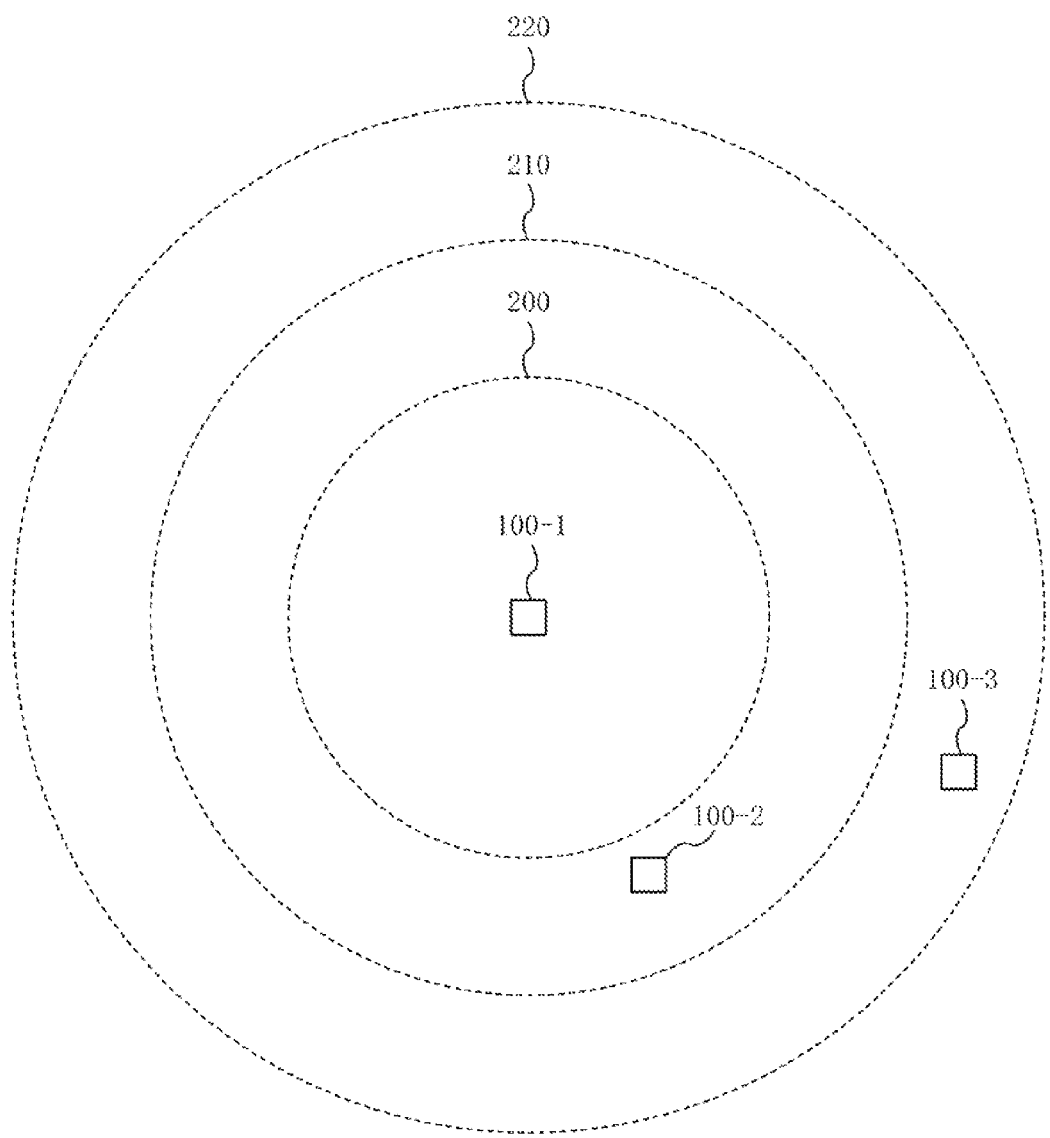
FIG. 4 is a drawing illustrating an exemplary configuration of communication in accordance with a single hop scheme in which a transmitting node and a receiving node directly communicate with each other.

As shown in FIG. 4, centering on a position of wireless communication device 100-1 being the transmitting node, minimum coverage 200, best coverage 210, and maximum coverage 220 of a radio wave transmitted from wireless communication device 100-1 exist. That is, if the transmission power from wireless communication device 100-1 is small, the reach of the radio waves is close to minimum coverage 200. On the other hand, if the transmission power from wireless communication device 100-1 is large, the reach of the radio waves is close to maximum coverage 220. Best coverage 210 is the reach of the radio waves transmitted with the best transmission power when wireless communication device 100-1 communicates with wireless communication device 100-2 being a receiving node. Wireless communication device 100-2 is a receiving node that communicates with wireless communication device 100-1. Wireless communication device 100-3 is a node that does not communicate with wireless communication device 100-1.

It should be noted that in FIG. 4, minimum coverage 200, best coverage 210, and maximum coverage 220 are concentric circles for the convenience of description, but actually, radio wave coverage is affected by circumstances such as an obstacle and the like, so that coverage is not necessarily a concentric circle.

Wireless communication device 100-2 and wireless communication device 100-3 also perform the same transmission power control. Therefore, the radio wave coverage of the node of wireless communication device 100-1 may be different from the radio wave coverage of the peripheral nodes, but in order to simplify explanation, it is assumed that the range of these radio signals is the same.

When wireless communication device 100-1 is installed, if the installation site of wireless communication device 100-1 is a place around which a number of other nodes that are not to be communication targets are installed (e.g., an urban area), wireless communication device 100-1 controls transmission power so that the radio wave coverage is minimum coverage 200 or best coverage 210 in order not to transmit an unnecessary radio wave to the other nodes that are not to be communication targets. On the other hand, if the installation site of wireless communication device 100-1 is a place around which other nodes that are not to be communication targets are not installed (e.g., a rural area), wireless communication device 100-1 controls transmission power so that the radio wave coverage is maximum coverage 220.

Figure 5:
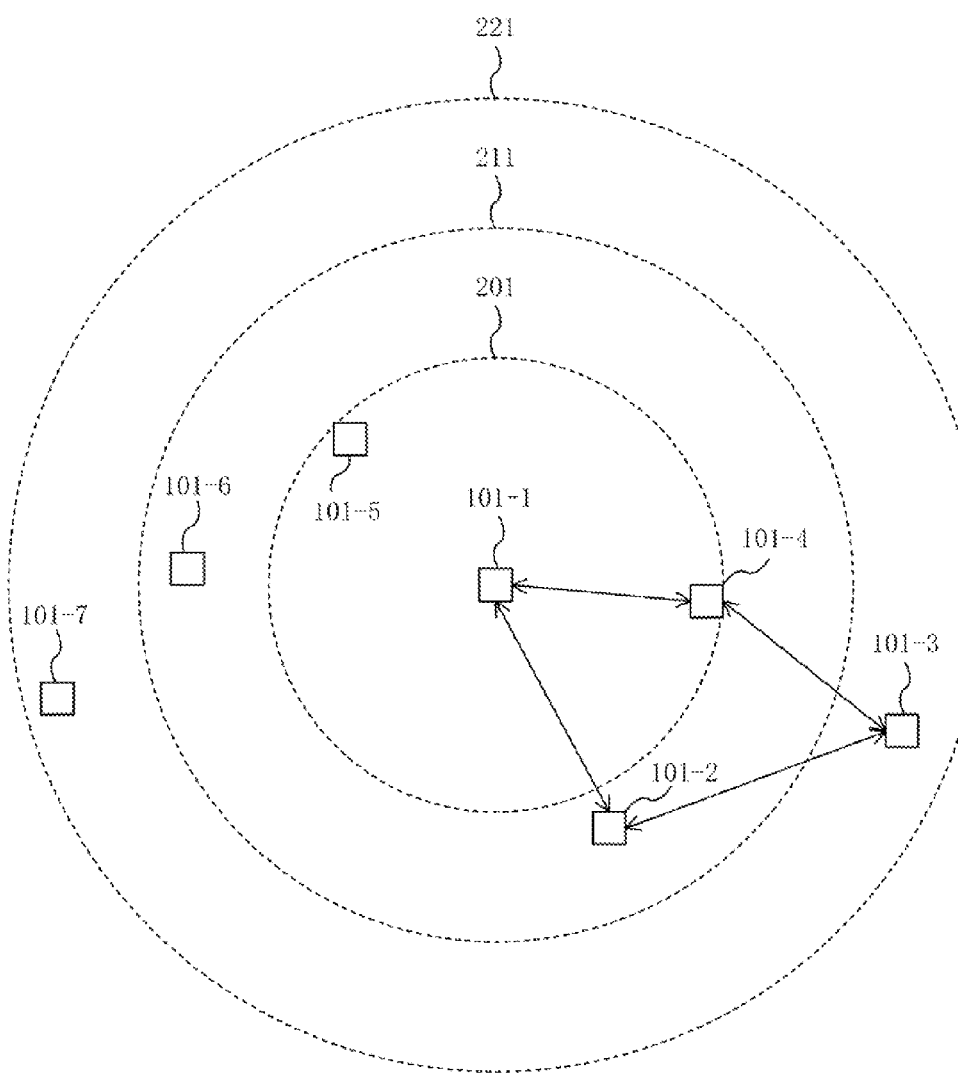
FIG. 5 is a drawing illustrating an exemplary configuration of communication in accordance with a multihop scheme in which a transmitting node and a receiving node communicate with each other through a relay node.

As shown in FIG. 5, wireless communication device 101-1 is positioned as being a transmitting node, wireless communication device 101-3 is positioned as being a receiving node, and wireless communication devices 101-2 and 101-4 are positioned as being relay nodes. The term "relay node" as used herein means a wireless communication device that relays a radio signal from a transmitting node to a receiving node during communication. Further, wireless communication devices 101-5 to 101-7 exist as nodes that cannot be used for communication between wireless communication device 101-1 and wireless communication device 101-3.

In addition, as with minimum coverage 200, best coverage 210, and maximum coverage 220 shown in FIG. 4, the coverage of radio waves transmitted from wireless communication device 101-1 is defined as minimum coverage 201, best coverage 211, and maximum coverage 221 depending on the transmission power.

In FIG. 5, by using multihop communication via wireless communication device 101-2 or wireless communication device 101-4, communication between wireless communication device 101-1 and wireless communication device 101-3 can be provided. Therefore, transmission power used by wireless communication device 101-1 to transmit a radio signal to wireless communication device 101-3 may be controlled so that radio wave coverage becomes best coverage 211, not maximum coverage 221.

In addition, wireless communication device 101-1 monitors and collects data concerning the communication quality of peripheral nodes, and accumulates this collected data concerning communication quality as statistical information. As a monitoring method, there may be a method of measuring the received field intensity of a radio wave transmitted from peripheral nodes and received at the node of wireless communication device 101-1, a method of calculating the error rate, and a method of acquiring degrees of received field intensities of radio waves, at peripheral nodes, transmitted from the node of wireless communication device 101-1 to the peripheral nodes.

For example, if transmission power is controlled so that radio wave coverage of wireless communication device 101-1 is minimum coverage 201, the statistical information that can be monitored is communication quality between wireless communication devices 101-1 and 101-4 and communication quality between wireless communication devices 101-1 and 101-5. In addition, if transmission power is controlled so that radio wave coverage of wireless communication device 101-1 is best coverage 211, the statistical information that can be monitored is communication quality between wireless communication devices 101-1 and 101-4 and communication quality between wireless communication devices 101-1 and 101-5 as well as communication quality between wireless communication devices 101-1 and 101-2 and communication quality between wireless communication devices 101-1 and 101-6.

Now, in a state where transmission power is controlled so that radio wave coverage of wireless communication device 101-1 is minimum coverage 201, if wireless communication device 101-1 attempts to communicate with wireless communication device 101-3, wireless communication device 101-1 will search for a route by using a routing protocol such as AODV. At this time, because wireless communication device 101-2, which can send (relay) a signal to wireless communication device 101-3, is outside the radio wave coverage, wireless communication device 101-2 does not send back a route-search result. Meanwhile, because wireless communication device 101-4, which can send (relay) a signal to wireless communication device 101-3, is within the radio wave coverage, wireless communication device 101-4 sends back a route-search result. Since a route to wireless communication device 101-3 has been established, wireless communication device 101-1 can communicate with wireless communication device 101-3.

In this state, the number of peripheral nodes necessary for communications (a predetermined device number), which is the number being stored in wireless communication device 101-1, is compared with the number of nodes that can communicate with wireless communication device 101-1.

When wireless communication is performed, the risks include movement of the node and deterioration in the quality of the wireless transmission path. Therefore, it is believed that the number of peripheral nodes necessary for stable communication is two or more. Now, as an example, assuming that the number of peripheral nodes necessary for stable communication is two, in a state where radio wave coverage is minimum coverage 201, a peripheral node with which wireless communication device 101-1 can communicate is only wireless communication device 101-4, and the number is lower than two, which is the number of peripheral nodes necessary for stable communication. Therefore, in order to increase the number of peripheral nodes with which wireless communication device 101-1 can communicate, wireless communication device 101-1 controls the transmission power so that the radio wave coverage becomes best coverage 211.

To control the transmission power, wireless communication device 101-1 first broadcasts a request to the peripheral nodes using current transmission power to clear (delete) statistical information.

Thereafter, transmission power control as described above will be performed.

Wireless communication device 101-1 requests the peripheral nodes to read out the statistical information at regular intervals or through a certain trigger. Referring to the statistical information included in a response message transmitted from the peripheral nodes in response to the request, wireless communication device 101-1 can combine the statistical information of signals received from the peripheral nodes, the information being accumulated in the node of wireless communication device 101-1 and the statistical information of signals transmitted from the node of wireless communication device 101-1, and the information being included in the peripheral nodes, to perform transmission power control based on bidirectional statistical information.

Figure 6:
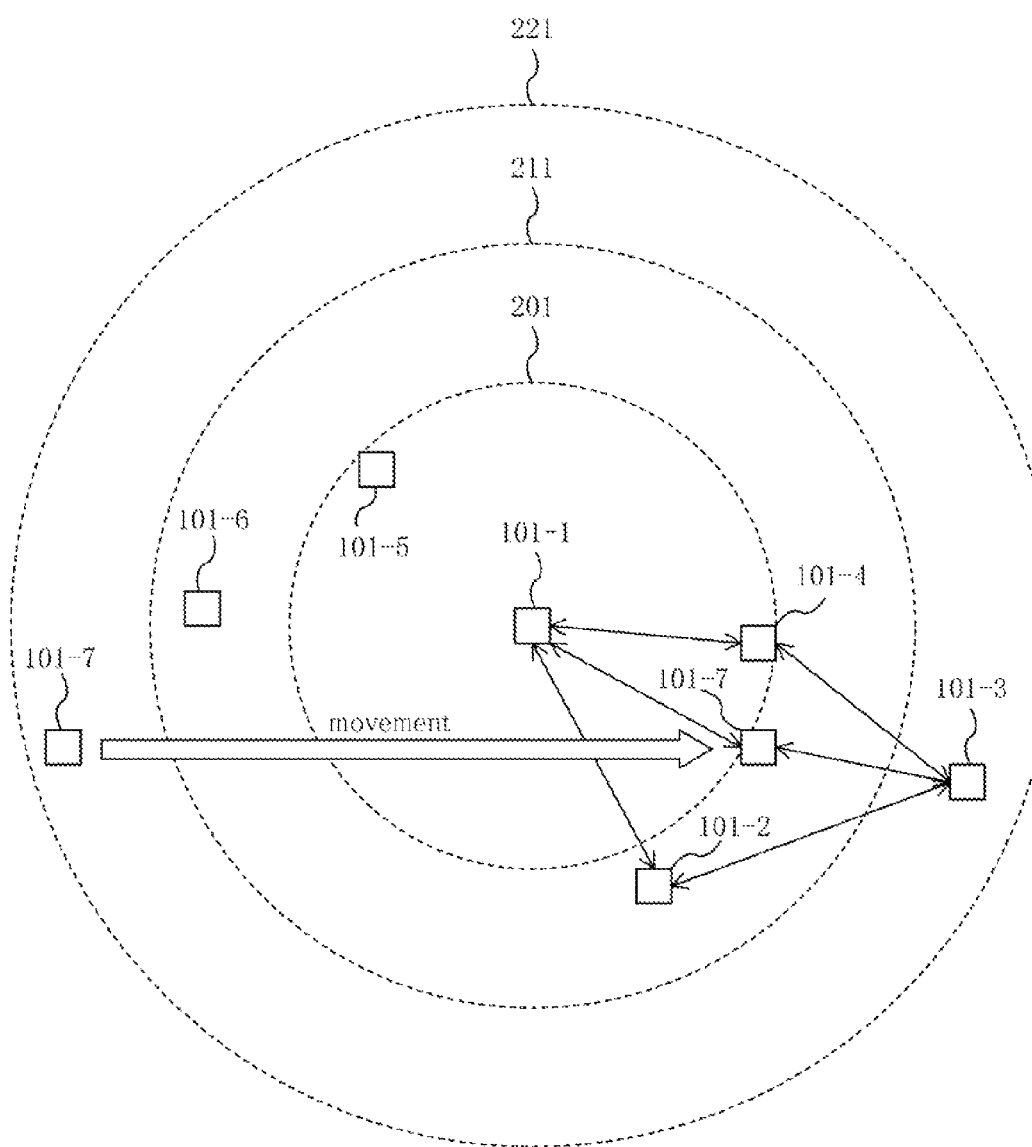
FIG. 6 is a drawing for explaining the transmission power controlling method applied when a wireless communication device moves in the configuration of FIG. 5.

In the configuration illustrated in FIG. 5, relay nodes necessary for communication between wireless communication device 101-1 and wireless communication device 101-3 are wireless communication device 101-2 and wireless communication device 101-4. Wireless communication device 101-7 moves thereto as shown in FIG. 6, and thereby wireless communication device 101-7 is also added as a relay node.

In such a state, the transmission power is controlled so that the number of peripheral nodes that can communicate with wireless communication device 101-1 becomes equal to or more than two, being the set number of peripheral nodes necessary for stable communication. In this case, the transmission power is controlled so that the radio wave coverage of wireless communication device 101-1 becomes best coverage 211, and thereby the number of peripheral nodes that can communicate with wireless communication device 101-1 becomes three, that is, the number becomes equal to or more than two, the set number of peripheral nodes necessary for stable communication.

To control the transmission power, wireless communication device 101-1 first broadcasts a request to the peripheral nodes using current transmission power to clear (delete) statistical information.

Thereafter, transmission power control as described above will be performed.

As described above, transmission power control is caused by the movement of wireless communication device 101-7, but it is desirable to perform periodical transmission power control by using a timer or the like.

As described above, in wireless communications, generally a few channels are shared from among a large number of nodes and a large number of communication schemes. Thus, in the present invention, radio wave coverage is controlled so as to minimize unnecessary interference. In this manner, in wireless communications, transmission power control can reduce unnecessary radio wave interference with peripheral nodes and allow a channel being used inside radio wave coverage to be simultaneously used outside the coverage to improve the usage efficiency of radio waves, as well as to reduce transmission delay caused by retransmission due to the unnecessary collision of signals.

Processing that is executed by each of the above-described components included in wireless communication device 100-1 may be executed by logical circuits each of which is made depending on a purpose. Also, a computer program (hereinafter, referred to as the program), in which processing is described as procedures, may be recorded on a recording medium readable by wireless communication device 100-1, and the program may be executed by causing wireless communication device 100-1 to read the program recorded on the recording medium. The recording medium readable by wireless communication device 100-1 refers to a movable recording medium such as a floppy (registered trademark) disk, a magneto-optical disk, a DVD, and a CD, as well as memory such as ROM and RAM, and an HDD included in wireless communication device 100-1. The program recorded on the recording medium is read by a CPU (not shown) installed in wireless communication device 100-1 and the same processes as those described above are executed by the control of the CPU. Note that the CPU operates as a computer for executing the program read from a recording medium having recorded thereon the program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication device for wirelessly communicating with other wireless communication devices by using a wireless network communication function, the device comprising:
   a wireless communication section that transmits and receives a radio signal transmitted from the other wireless communication devices;
   a quality measuring section that measures reception quality of the radio signal received by said wireless communication section;
   a quality information transmitting section that transmits reception quality information indicating the reception quality measured by said quality measuring section to the other wireless communication devices through said wireless communication section;
   a device number calculating section that calculates, based on reception quality indicated by reception quality information transmitted from the other wireless communication devices and the reception quality measured by said quality measuring section, a number of wireless communication devices, from among the other wireless communication devices, that can communicate with the wireless communication device; and
   a power value determining section that compares the number of the wireless communication devices calculated by said device number calculating section with a predetermined number of devices, to determine, on the basis of a comparison result, a transmission power value for said wireless communication section to transmit the radio signal,
   wherein said wireless communication section transmits the radio signal by using transmission power of the transmission power value determined by said power value determining section.

2. The wireless communication device according to claim 1, wherein if an external device connected with the wireless communication device designates the predetermined number of devices, said power value determining section compares the designated number of the devices with the number of the wireless communication devices calculated by said device number calculating section.

3. The wireless communication device according to claim 1, wherein said quality measuring section measures, as the reception quality, a received field intensity of a radio signal received by said wireless communication section.

4. The wireless communication device according to claim 1, wherein said quality measuring section measures, as the reception quality, an error rate in radio signals received by said wireless communication section.

5. The wireless communication device according to claim 1, wherein if the number of wireless communication devices calculated by said device number calculating section is lower than the predetermined device number, said power value determining section increases the transmission power value; if the number of wireless communication devices calculated by said device number calculating section is higher than the predetermined device number, said power value determining section decreases the transmission power value; and if the number of wireless communication devices calculated by said device number calculating section is equal to the predetermined device number, said power value determining section maintains the transmission power value.

6. The wireless communication device according to claim 1, wherein if said quality measuring section does not measure the reception quality or if the reception quality information is not transmitted from the other wireless communication devices, said power value determining section determines a preset initial value as the transmission power value.

7. The wireless communication device according to claim 1, further comprising a storage that stores the reception quality information transmitted from the other wireless communication devices and the reception quality information indicating the reception quality measured by said quality measuring section,
wherein said device number calculating section calculates, based on the reception quality indicated by the reception quality information stored in said storage, a number of wireless communication devices that can communicate with the wireless communication device.

8. The wireless communication device according to claim 7, further comprising:
a deletion requesting section that requests the other wireless communication devices to, when said power value determining section changes the transmission power value, delete the reception quality information stored in the other wireless communication devices; and
an information deleting section that deletes the reception quality information stored in said storage when the other wireless communication devices request the wireless communication device to delete the reception quality information.

9. The wireless communication device according to claim 7, further comprising:
an information deleting section that deletes the reception quality information stored in said storage when the other wireless communication devices request the wireless communication device to delete the reception quality information.

10. A transmission power controlling method of controlling transmission power used to transmit a radio signal by a wireless communication device for wirelessly communicating with other wireless communication devices by using a wireless network communication function, the method comprising the processes of:
measuring reception quality of a radio signal transmitted from the other wireless communication devices;
transmitting reception quality information indicating the measured reception quality to the other wireless communication devices;
calculating, based on the reception quality indicated by the reception quality information transmitted from the other wireless communication devices and the measured reception quality, the number of wireless communication devices, from among the other wireless communication devices, that can communicate with the wireless communication device;
comparing the calculated number of the wireless communication devices with a predetermined device number;
determining, on the basis of a comparison result, a transmission power value for transmitting the radio signal; and
transmitting the radio signal by using transmission power of the determined transmission power value.

11. The wireless communication device according to claim 7, further comprising:
a deletion requesting section that requests the other wireless communication devices to, when said power value determining section changes the transmission power value, delete the reception quality information stored in the other wireless communication devices.

12. The wireless communication device according to claim 11, wherein said quality measuring section measures the reception quality after said deletion requesting section requests delete the reception quality information.

13. The wireless communication device according to claim 11, wherein said power value determining section determines said transmission power value after said deletion requesting section requests delete the reception quality information.

* * * * *